United States Patent [19]

Abaeva et al.

[11] 4,197,197

[45] Apr. 8, 1980

[54] METHOD FOR REMOVING OIL FILM FROM WATER SURFACE

[76] Inventors: Tatyana V. Abaeva, prospekt Oktyabrya, 158, kv. 48, Ufa; Nina M. Antonova, ulitsa Zhukovskogo, 9, kv. 2, Moscow; Junus K. Lukmanov, prospekt Oktyabrya 61-2, kv. 79, Ufa; Olga S. Mochalova, ulitsa Kominterna, 26, korpus 2, kv. 125, Moscow; Inna A. Nemirovskaya, ulitsa Marii Ulyanovoi, 23, kv. 47, Moscow; Maria P. Mesterova, Volokolamskoe shosse, 14, kv. 116, Moscow; Lev A. Pelevin, ulitsa Chernyshevskogo, 103a, kv. 1; Gennady N. Pozdnyshev, ulitsa 50 let USSR, 48, kv. 286, both of Ufa; Jury S. Smirnov, Volzhsky prospekt, 47, kv. 47, Kuibyshev; Arkady B. Taubman, Leninsky prospekt, 78, kv. 68, Moscow, all of U.S.S.R.

[21] Appl. No.: 842,536

[22] Filed: Oct. 14, 1977

Related U.S. Application Data

[63] Continuation of Ser. No. 699,962, Jun. 25, 1976, abandoned.

[51] Int. Cl.$^2$ .................................................. C02B 1/18
[52] U.S. Cl. ............................... 210/59; 210/DIG. 27; 252/312; 252/351; 252/DIG. 17
[58] Field of Search ...................... 252/351, DIG. 17; 210/DIG. 27, 59

[56] References Cited

U.S. PATENT DOCUMENTS

| | | | |
|---|---|---|---|
| 3,004,056 | 10/1961 | Nunn, Jr. et al. | 252/351 X |
| 3,033,889 | 5/1962 | Chiddix et al. | 252/351 X |
| 3,462,520 | 8/1969 | Nehmsmann et al. | 252/351 X |
| 3,625,857 | 12/1971 | Weimer et al. | 252/351 X |
| 3,642,740 | 2/1972 | Pierce, Jr. | 526/911 X |

*Primary Examiner*—Richard D. Lovering
*Attorney, Agent, or Firm*—Haseltine, Lake & Waters

[57] ABSTRACT

The present invention relates to a dispersant for removing petroleum and petroleum products from the surface of water basins.

Said dispersant comprises an aqueous solution of a surfactant, viz. a mixture of salts of phosphoric acid esters and hydroxyethylated higher aliphatic alcohols of the formula:

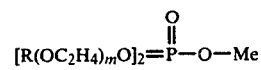

wherein
R is an alkyl radical of a normal or iso- structure containing 7 to 12 carbon atoms;
Me is an alkali metal;
m=4 to 6.

The dispersant according to the present invention is a non-toxic biologically degradable compound which enables its use for the removal of petroleum and petroleum products not only from the sea surface but also from the surface of shallow and small-size closed water basins.

3 Claims, No Drawings

METHOD FOR REMOVING OIL FILM FROM WATER SURFACE

This is a Rule 60 continuation of U.S. Patent Application Ser. No. 699,962, filed June 25, 1976, now abandoned.

The present invention relates to the agents intended for removing petroleum and petroleum products from the surface of water basins and, more specifically, to dispersants.

Said dispersants are employed for dispersing petroleum and petroleum products both on the sea surface and on the surface of freshwater basins such as lakes and ponds.

Known in the art is an agent for removing petroleum from the water surface by the dispersing method which contains a surfactant such as sorbitan monoacylate, or a polyalkylene oxide derivatives of a sorbitan monoacylate or their mixture which are employed either individually or in a combination with a hydrocarbon solvent. Reducing a surface tension at the interface petroleum-water, this agent facilitates a rapid formation of a thin emulsion of petroleum in water with a globule diameter of from 1 to 10μ. This agent, however, is employed by way of atomization under a high pressure with obligatory intermixing performed by any conventional method. Moreover, this agent is but less effective for dispersing heavy and high-paraffin petroleum.

Also known in the art are other dispersants based on surfactants such as sorbitane monooleate with 20 mol.% of ethylene oxide; hydroxyethylated tall oil of fatty acids; saturated or unsaturated aliphatic alcohols containing 1 to 20 carbon atoms.

All these prior art dispersants incorporate a hydrocarbon solvent which imparts a high toxicity thereto.

It is an object of the present invention to provide a nontoxic dispersant possessing a high dispersing power and containing no hydrocarbon solvent.

This and other objects of the present invention are accomplished by that a dispersant for removing petroleum and petroleum products from the surface of water basins based on a surfactant comprises, in accordance with the present invention, an aqueous solution of a mixture of salts of phosphoric acid esters and hydroxyethylated higher aliphatic alcohols of the formula:

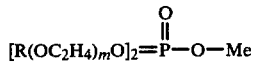

wherein R is an alkyl radical of a normal or iso- structure containing 7 to 12 carbon atoms; Me is an alkali metal, m=4−6.

A specific feature of these componds resides in their ability of being readily soluble in water but in petroleum as well, wherefore upon application of aqueous solutions thereof onto the petroleum layer they partially penetrate thereinto. This process of re-distribution between water and petroleum film substantially intensifies the process of turbulization of the interface water-petroleum thus forming a direct-type emulsion "oil-in-water", the drops of the latter emulsion being distributed within the water volume. In doing so, inverse emulsions of the type "water-in-oil" which are undesirable, are not formed.

It is advisable to employ a dispersant comprising a 0.1–10% aqueous solution of a mixture of salts of phosphoric acid esters and hydroxyethylated higher aliphatic alcohols.

To stabilize the emulsified petroleum, it is advisable to use a dispersant containing also a water-soluble polymer in an amount ranging from 0.2 to 2% by weight.

The process for producing the dispersant according to the present invention is effected in the following manner.

To prepare a mixture of salts of phosphoric acid esters and hydroxyethylated higher aliphatic alcohols of the above-mentioned generic formula, a mixture of polyethylene-glycol ethers of higher alcohols containing 7 to 12 carbon atoms with a degree of hydroxyethylation, m, ranging from 4 to 6 is reacted with phosphorus oxychloride. The reaction is conducted in a medium of an aromatic organic solvent such as toluene. It is desirable that the reaction be conducted in the presence of an acceptor, i.e. hydrogen chloride. Chloroanhydrides of phosphoric acids produced in the reaction are treated with an aqueous solution of an alkali metal hydroxide. As a result, a surface-active substance is obtained which comprises a mixture of salts of phosphoric acid esters and hydroxyethylated higher aliphatic alcohols of the above-mentioned generic formula which mixture possesses dispersing properties.

To prepare the dispersant according to the present invention, the resulting mixture of salts is dissolved in water to a required concentration.

For example, most preferable working concentrations of salts in the solutions as within the range of from 0.1 to 10% by weight. These solutions are prepared in situ, by diluting more concentrated solutions, e.g. with a concentration of from 50 to 90% by weight, with water.

The dispersant according to the present invention may also contain a water-soluble polymer such as gelatine, casein, polyvinyl alcohol, carboxymethylcellulose in an amount of from 0.2 to 2.0% by weight.

The content of the water-soluble polymer of below 0.2% by weight results in a reduced dispersing ability of the dispersant, whereas the content above 2% by weight results in an increased viscosity of the dispersant thus complicated its application.

To prepare the dispersant according to the present invention, a calculated amount of the water-soluble polymer is dissolved in water heated to a temperature of from 40° to 50° C., and then the solution is mixed, under stirring, with a mixture of salts of phosphoric acid esters and hydroxyethylated higher aliphatic alcohols. Thereafter, the mixture is diluted with water to a required concentration.

The dispersant according to the present invention is practically employed by atomization from aqueous solutions, for example, of a 0.1–10% concentration onto the surface of a film of petroleum. Therewith, an emulsion of the direct type "oil-in-water" is formed which is dissipated within the bulk of water.

The dispersant according to the present invention is employed in an amount of from 1 to 10 parts by weight per 100 parts by weight of petroleum. Atomization of the dispersant is effected either from beach or from a ship through atomizing nozzles under a pressure of 2–3 atm. After atomization of the dispersant, a continuous surface of the petroleum film is broken. Agitation created by the ship movement contributes to a rapid disintegration of the emulsified petroleum film.

Under laboratory conditions, efficiency of the dispersant according to the present invention is evaluated by the time during which a half amount of the emulsified petroleum is recovered in a centrifuge. As a model petroleum phase use is made of a mixture of hydrocarbons consisting of 80% by weight of decane and 20% by weight of toluene.

The dispersant of the present invention is a biologically degradable non-toxic agent which provides an opportunity of using thereof not only for the removal of petroleum and its products from the sea surface but in shallow and small-size closed water basins.

Unlike the prior art dispersing agent based on sorbitane monoacylate or its hydroxyethylated derivatives or a mixture thereof, the dispersant according to the present invention contains a surface active agent reducing surface tension at the interface petroleum-dispersant by 2 times.

This low surface tension facilitates emulsification of petroleum at the surface of water basins with lesser consumption of mechanical energy.

In contrast to the dispersing agent based on sorbitane monoacylate, its hydroxyethylated derivatives or a mixture thereof, the dispersant according to the present invention incorporates a water-soluble polymer which forms a high-viscous elastic film around the petroleum emulsion drops in water, thus preventing the emulsion coalescence and, consequently, increasing its stability.

An important advantage of the dispersant according to the present invention resides in that it is capable of emulsifying heavy paraffin oils; it is also capable of breaking inverse emulsions of the type "chocolate mousse" which are formed as a result of lasting residence of petroleum film in water. Tests performed with the dispersant according to the present invention have shown that it is capable of completely dehydrating inverse emulsions of the type "water-in-oil".

For the comparison purposes, some principal properties of the dispersants according to the present invention and those of a dispersing agent based on sorbitane monoacylate are shown in Table hereinbelow.

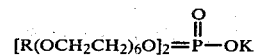

wherein R is an alkyl of a normal or iso-structure containing 7 to 12 carbon atoms are dissolved in 100 l of water.

Stability of a hydrocarbon emulsion (a mixture of 80% by weight of decane and 20% by weight of toluene) stabilized by the thus-prepared dispersant is determined by the time during which the dispersing phase is evolved upon breaking the emulsion in a centrifugal field. It is equal to 40 min.

Upon spraying the dispersant onto the surface of petroleum film, continuous surface of the film is broken, petroleum is dispersed and dissipated within the bulk of water.

EXAMPLE 2

To prepare 100 kg of the dispersant according to the present invention, 5 kg of potassium salts of phosphoric acid esters and hydroxyethylated higher aliphatic alcohols having the formula:

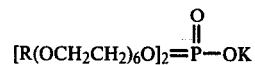

wherein R is an alkyl of a normal or iso-structure containing 7 to 12 atoms of carbon are dissolved in 90 l of water.

0.2 kg of gelatine is dissolved in 10 l of water heated to a temperature of 50° to 60° C. Both solutions are combined and thoroughly intermixed.

Stability of a hydrocarbon emulsion (a mixture of 80% by weight of decane and 20% by weight of toluene) determined by the time (minutes) during which a half amount of the dispersing phase is evolved upon breaking the emulsion in a centrifugal field is 56 minutes.

| Dispersant | Surface tension at the interface air-dispersant, erg/cm$^2$ | Interface tension of the system "pertroleum-dispersant", erg/cm$^2$ | De-emulsifying ability as percent of water evolved from emulsion "water-in-oil" | Stability of "oil-in-water" emulsion stabilized with dispersants, minutes |
|---|---|---|---|---|
| Dispersing agent of British Patent No. 1,255,394 | 40.0 | 7.0 | 0.0 | 31.0 |
| Dispersant based on a mixture of salts of phosphoric acid esters and hydroxyethylated higher aliphatic alcohols of the above-given formula | 30 | 3.5 | 100.0 | 56.0 |

For a better understanding of the present invention, some specific examples illustrating the preparation of the dispersant for removing petroleum and petroleum products from the surface of water basins according to the present invention are given hereinbelow.

EXAMPLE 1

To prepare 100 kg of the dispersant according to the present invention, 5 kg of potassium salts of phosphoric acid esters and hydroxyethylated higher aliphatic alcohols of the formula:

Upon spraying the dispersant thus prepared onto the surface of petroleum film, continuous surface of the film is broken, the petroleum product is dispersed and dissipated within the bulk of water.

EXAMPLE 3

To prepare 100 kg of the dispersant according to the present invention, 2 kg of sodium salts of phosphoric acid esters and hydroxyethylated higher aliphatic alcohols having the formula:

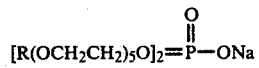

wherein R is an alkyl of a normal or iso-structure containing 7 to 12 carbon atoms are dissolved in 90 l of water.

0.2 kg of polyvinyl alcohol is dissolved in 10 l of water heated to a temperature of from 50° to 60° C. Both solutions are combined and thoroughly intermixed.

Stability of a hydrocarbon emulsion (a mixture of 80% by weight of decane and 20% by weight of toluene) determined by the time (minutes) during which a half amount of the dispersing phase is evolved upon breaking the emulsion in a centrifugal field, is 35 minutes.

EXAMPLE 4

To prepare 100 kg of the dispersant according to the present invention, 30 kg of potassium salts of phosphoric acid esters and hydroxyethylated higher aliphatic alcohols having the formula:

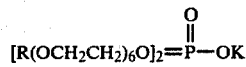

wherein R is an alkyl of a normal or iso-structure containing 7 to 12 carbon atoms are dissolved in 60 l of water.

0.2 kg of gelatine is dissolved in 10 l of water heated to a temperature of from 50° to 60° C.; both solutions are combined and thoroughly intermixed.

Stability of a hydrocarbon emulsion (a mixture of 80% by weight of decane and 20% by weight of toluene) stabilized by this dispersant is extremely high. The emulsion is not broken in a centrifugal field.

EXAMPLE 5

To prepare 100 kg of the dispersant according to the present invention, use is made of 70 kg of sodium salts of phosphoric acid esters and hydroxyethylated higher aliphatic alcohols having the formula:

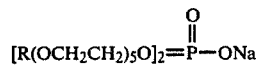

wherein R is an alkyl of a normal or iso-structure containing 7 to 12 carbon atoms.

0.2 kg of polyvinyl alcohol are dissolved in 30 l of water heated to a temperature of from 50° to 60° C. The resulting solution of polyvinyl alcohol is mixed, under stirring, with the above mixture of sodium salts of phosphoric acid esters and hydroxyethylated higher aliphatic alcohols of the above-given formula.

Stability of hydrocarbon emulsions (a mixture of 80% by weight of decane and 20% by weight of toluene) stabilized with this dispersant is extremely high. The emulsions are not broken in a centrifugal field.

What is claimed is:

1. A method for removing an oil film from a water surface comprising applying a dispersant onto the oil film, said dispersant comprising an aqueous solution of a mixture of salts of phosphoric acid esters and oxyalkylene higher aliphatic alcohols having the formula:

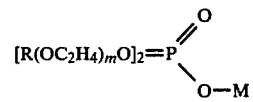

wherein R is selected from the group consisting of n-alkyl radicals having from 7 to 12 carbon atoms, M is an alkali metal and m is 4 to 6.

2. A method as defined in claim 1, which comprises said dispersant as a 0.1–10% aqueous solution of said mixture of salts of esters of phosphoric acid and a mixture of oxyalkylene higher aliphatic alcohols.

3. A method as defined in claim 1, wherein said dispersant additionally contains a water-soluble polymer selected from the group consisting of gelatin, casein and polyvinyl alcohol, with a content of 0.2–2 weight percent.

* * * * *